Dec. 18, 1962     F. SOLOMON ET AL     3,069,486
ELECTROCHEMICAL ELECTRODE STRUCTURE
Filed May 26, 1958     2 Sheets-Sheet 1

FRANK SOLOMON
KENNETH N. BROWN
RENATO DI PASQUALE
INVENTORS.

BY Karl F. Ross

AGENT

Dec. 18, 1962    F. SOLOMON ET AL    3,069,486
ELECTROCHEMICAL ELECTRODE STRUCTURE
Filed May 26, 1958    2 Sheets-Sheet 2

FRANK SOLOMON
KENNETH N. BROWN
RENATO DI PASQUALE
INVENTORS.

BY     Karl F. Ross

AGENT

United States Patent Office 3,069,486
Patented Dec. 18, 1962

3,069,486
ELECTROCHEMICAL ELECTRODE STRUCTURE
Frank Solomon, Great Neck, N.Y., and Kenneth N. Brown, Teaneck, and Renato Di Pasquale, Rutherford, N.J., assignors to Yardney International Corp., New York, N.Y., a corporation of New York
Filed May 26, 1958, Ser. No. 737,567
5 Claims. (Cl. 136—30)

The present invention relates to electrochemical cells for primary and storage batteries and more particularly, though not exclusively, to zinc-electrode assemblies and batteries containing such assemblies.

Electrochemical cells using zinc plates as the negative electrodes include the silver-zinc, nickel-zinc, copper-zinc and mercury-zinc wet and dry cells as well as systems with other depolarizers. The use of zinc is widespread in the battery industry because this metal affords high electrode efficiency and permits high-rate discharge at good capacities per unit weight as compared to other negative-electrode materials.

It is the general objective of this invention to provide improved-high-rate batteries and special electrode assemblies for such batteries.

It is a further object of this invention to provide a composite electrode assembly containing zinc as an active material and yielding higher discharge rates heretofore than conventional electrodes of similar weight containing sheet zinc.

Still another object is to provide a zinc-electrode assembly for alkaline accumulators which maintain its excellent discharge rate and capacity over a large number of charge cycles.

The above objects are achieved by a composite electrode assembly made up of several layers of expanded active metal, preferably having one or more sheets of a non-conductive, permeable or semi-permeable electrolyte-storing material sandwiched therebetween, which are joined together (e.g. at marginal zones beyond the periphery of the electrolyte-permeable sheet material) by a thermal bond under pressure and heat at a temperature below the melting point of the metal. In addition, the layers of zinc or other metal are preferably positioned in a certain specific relationship to insure maximum access of the electrolyte to the active material.

Under some circumstances, the electrode structures according to the invention would normally have, because of their large surface area, an excessive tendency to react with the electrolyte on open circuit and to polarize at high discharge rates. This can be remedied by a controlled amalgamation of the active material.

The invention will be further described with respect to the accompanying drawing wherein.

Figure 1:
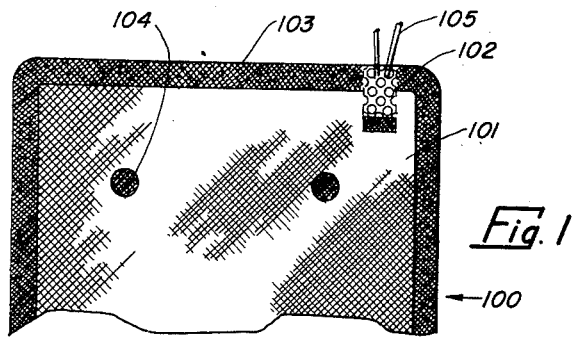
FIG. 1 is a plan view of a laminated structure according to this invention.
Figure 2:
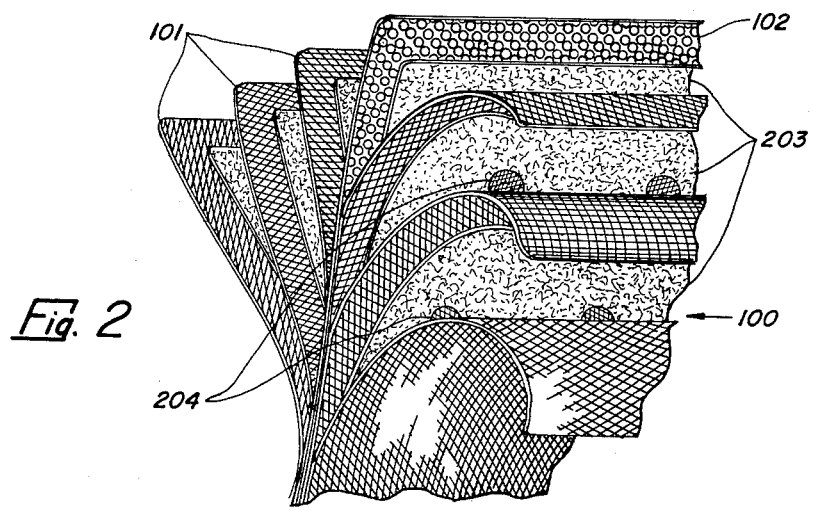
FIG. 2 is a perspective view of this structure before final assembly, illustrating several layers of expanded metal interleaved with sheets of irrigating material.

Referring to FIGS. 1 and 2, the laminated electrode 100 comprises several expanded-metal layers 101 obtained by perforating and stretching flat sheets of zinc or other electrochemically active material. These layers are fusion-bonded along a marginal zone 103, and at intermediate zones 104 of limited extent, to one another and to a centrally positioned grid 102 having leads 105 secured thereto by welding or other means; grid 102 may be of copper, silver or any other highly conductive, relatively inert metal in sheet, mesh, mat or other suitable form.

Interposed between the several layers of expanded metal 101 and the conductor 102 are electrolyte-storing layers 203 of permeable or semi-permeable, non-conductive material such as paper, regenerated cellulose, cellophane, polyvinyl-alcohol film, wooden plaques, fiberglass or nylon mesh. The conductive layers 101 and 102 project beyond the edges of storage layers 203 and the latter are provided with cutouts 204 to allow for free contact of the metallic elements in order to permit the formation of the marginal and internal zones 103, 104 of thermal fusion by which the layers 203 are locked between the sealed layers 101 of expanded metal and the conductor 102. By virtue of the presence of the electrolyte-storing, irrigating material 203 within the body of the electrode 100, large volumes of electrolyte are maintained in close contact with and immobilized at the active faces of the electrode, independent of any position which the battery may assume; the electrolyte-permeated material 203 further serves to keep the active faces of the electrode cool and wet even during discharge of cells at high-discharge rates, e.g. where the entire useful capacity is to be drained in an interval of one minute.

The joining of the layers 101 of expanded metal to the conductor 102 and to one another is best achieved by low-temperature bonding. When the active metal is zinc, pressures of 30–150 kg./cm.$^2$, applied for a few seconds with temperatures ranging from 150° to 375° C., form a homogeneous seal at zones 103 and 104. These temperatures, while being below the melting point of the active metal, are high enough to decompose surface oxides which would interfere with the bonding. The homogeneous seal so formed allows the bonding zones 103, 104 of the active layers to continue as chemically active areas, thereby permitting high current rates by insuring intimate contact between the active material and the conductive grid 102. The intermediate sealed areas 104 further serve to prevent shifting and buckling of the electrode layers during high-rate discharge.

Figure 3:
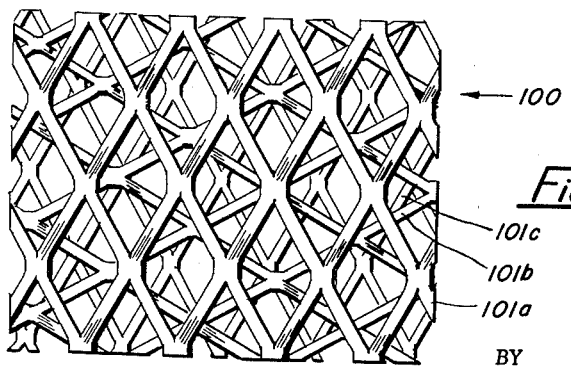
FIG. 3 is a fragmentary view of some of the expanded metal layers forming part of an electrode embodying this invention, with the intervening non-conductive layers removed.

FIG. 3 shows the lattice arrangement of a number of relatively staggered expanded-metal sheets 101a, 101b, 101c forming part of the electrode 100. The staggered sheets of expanded metal have a very large effective surface area and, unlike electrodes made from compacted comminuted particles, provide easy electrolyte access while not being polarized by the accumulation of dissolved discharge products or cell gases.

The interstices of the expanded metal may be filled with a paste of zinc oxide and/or metallic zinc powder or other active metal in comminuted form. This powder may be reduced in situ by conventional electroforming, electrolytic charging or dry-charging procedure. The advantage of adding such comminuted material is that it provides a reservoir of easily activated metal to maintain the capacities of the cells during extended cycling.

Figure 4:
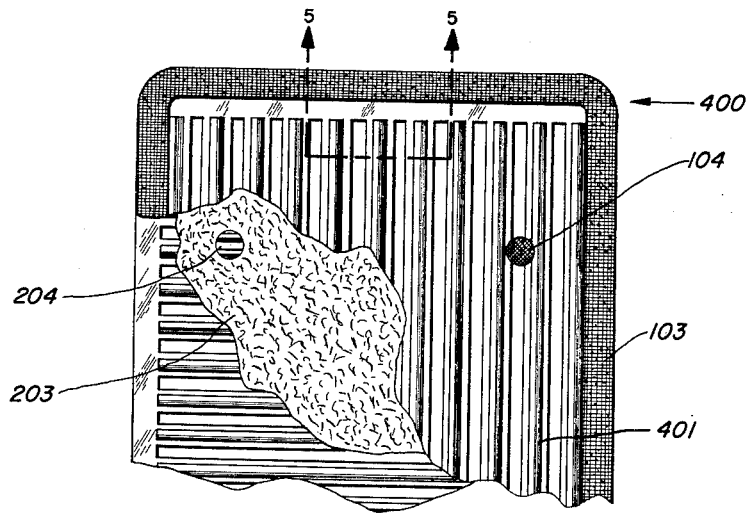
FIG. 4 is a plan view (parts broken away) of a modified electrode according to this invention.
Figure 5:
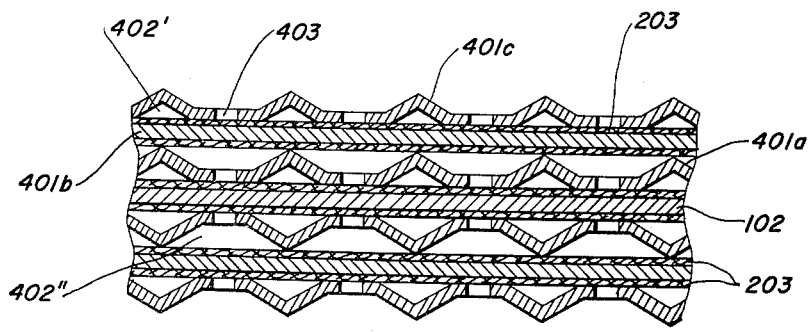
FIG. 5 is an enlarged cross-sectional view taken along line 5—5 of FIG. 4.

A further embodiment is shown in FIGS. 4 and 5 in which the expanded-metal layers 101 have been replaced by laminated sheets 401 to form an electrode 400. Sheets 401 are slitted by roll-shearing and bending operations to form a network of parallel, grooved metallic filaments providing triangular and trapezoidal electrolyte retention channels 402', 402'' as well as slots 403 as shown in the cross-sectional view of FIG. 5. Adjacent corrugated metal layers 401a, 401b, 401c are positioned at right angles to one another and are interleaved with irrigating membranes 203 in the manner described above with respect to layers 101. As the electrolyte contacts the filaments of each layer 401 of the electrode 400, the liquid accumulates in the channels 402', 402'' and is distributed along the entire surface face of each electrode layer.

Because of the large surface area offered by the electrode, there exists a marked tendency for an electrode to react with the electrolyte on open circuit and to polarize at high discharge rates if the entire material of layers 101 or 401 is zinc. By treating the assembled electrode with a solution of mercury salts, an amalgam containing 0.035±0.015%, by weight, of mercury is deposited on the zinc. The presence of the amalgam controls the evolution of hydrogen gas at the electrode during high-rate discharge and thereby permits full access of the electrolyte to the electrode. It is of course understood that the mercury is reduced in situ on the zinc in varying amounts, regions of highest activity reducing the greatest amounts of mercury.

The above invention may be realized in a number of variations, which will be apparent to those skilled in the art within the scope of the following claim.

We claim:

1. An electrode assembly for electrochemical cells comprising an assembly of multiple layers of perforated zinc material and at least one layer of a more highly conductive metal capable of functioning as a collector of electricity, the perforations in said zinc material extending through the thickness thereof whereby liquid electrolyte may pass therethrough and be stored therein, non-conductive electrolyte-permeable material disposed between layers of said metallic materials, said non-conductive material extending across only a portion of the surface area of said metallic layers and leaving a substantial peripheral zone of metal which extends beyond the margins of said non-conductive material whereby said metallic layers are in electrical contact with each other, said metallic layers being bonded together along a substantial area of said peripheral zone which forms a seal that encloses said non-conductive material.

2. An electrode assembly according to claim 1 wherein the zinc is amalgamated.

3. An electrode assembly according to claim 1 wherein said layer of highly conductive metal is selected from the class consisting of perforated copper and silver material.

4. An electrode assembly according to claim 1 wherein said non-conductive permeable material is selected from the group consisting of regenerated cellulose, paper, polyvinyl alcohol film, wooden plaques, fiberglass and nylon mesh.

5. An electrode according to claim 1 including electrolyte-retaining channels disposed adjacent said perforations in said zinc material.

References Cited in the file of this patent

UNITED STATES PATENTS

| | | |
|---|---|---|
| 504,455 | Reed | Sept. 5, 1893 |
| 519,602 | Elieson | May 8, 1894 |
| 624,230 | Marquand | May 2, 1899 |
| 1,055,221 | Piotrowski et al. | Mar. 4, 1913 |
| 1,376,566 | Murphy | May 3, 1921 |
| 2,023,170 | Haunz | Dec. 3, 1935 |
| 2,375,211 | Brennan | May 8, 1945 |
| 2,463,565 | Ruben | Mar. 8, 1949 |
| 2,527,576 | Ruben | Oct. 31, 1950 |
| 2,684,396 | Barrett | July 20, 1954 |
| 2,700,062 | Schlecht et al. | Jan. 18, 1955 |
| 2,776,331 | Chapman | Jan. 1, 1957 |
| 2,830,108 | Peters | Apr. 8, 1958 |
| 2,833,847 | Salauze | May 6, 1958 |
| 2,867,678 | Doyen | Jan. 6, 1959 |

FOREIGN PATENTS

| | | |
|---|---|---|
| 23,489 | Great Britain | 1897 |